United States Patent [19]

Yamaguchi et al.

[11] Patent Number: 5,299,541
[45] Date of Patent: Apr. 5, 1994

[54] HIGH-PRESSURE FUEL INJECTION TUBE FOR DIESEL ENGINE

[75] Inventors: Isao Yamaguchi, Mishima; Yasushi Sakamoto, Tagata, both of Japan

[73] Assignee: Usui Kokusai Sangyo Kaisha Ltd., Japan

[21] Appl. No.: 48,770

[22] Filed: Apr. 16, 1993

[30] Foreign Application Priority Data

Apr. 17, 1992 [JP] Japan .................................. 4-124196

[51] Int. Cl.⁵ ........................ F02M 55/02; F16L 11/12
[52] U.S. Cl. .................................. 123/468; 285/138; 285/302
[58] Field of Search ............... 123/456, 468, 469, 470; 285/49, 138, 302

[56] References Cited

U.S. PATENT DOCUMENTS

| | | | |
|---|---|---|---|
| 4,084,842 | 4/1978 | Stonitsch et al. | 285/138 |
| 4,221,405 | 9/1980 | Stonitsch et al. | 285/138 |
| 4,591,193 | 5/1986 | Oltmanns et al. | 285/138 |
| 4,665,876 | 5/1987 | Hashimoto | 123/468 |
| 4,776,617 | 10/1988 | Sato | 285/302 |
| 4,893,601 | 1/1990 | Sugao | 123/468 |
| 4,913,119 | 4/1990 | Usui | 123/468 |
| 5,011,193 | 4/1991 | Porte | 285/302 |

*Primary Examiner*—E. Rollins Cross
*Assistant Examiner*—Thomas N. Moulis
*Attorney, Agent, or Firm*—Anthony J. Casella; Gerald E. Hespos

[57] ABSTRACT

A high-pressure fuel injection tube for a diesel engine, comprising: a tube body having connecting heads at its two end portions; fastening nuts assembled at the backs of the connecting heads; a pair of separate outer tubes so fitted on the outer circumference of the tube body as to be spaced from each other at a gap between the opposed end faces thereof and to move in the axial direction; seal ring members so fitted on the outer circumferences of the outer tubes in the vicinity of the outer end portions of the outer tubes as to engage with the fastening nuts respectively; and a relatively short joint cylinder fitted on the outer circumferences of the outer tubes across the inner end portions of the outer tubes. Further comprised is a seal ring member which is fitted between at least one fitted end portion of the joint cylinder and the outer circumference of the faced one of the outer tubes.

10 Claims, 4 Drawing Sheets

HIGH-PRESSURE FUEL INJECTION TUBE FOR DIESEL ENGINE

BACKGROUND OF THE INVENTION

1. Field of the Invention

The present invention relates to a high-pressure fuel injection tube having a diameter as small as about 30 mm or less, which is arranged as a fuel conduit in the vicinity of a diesel engine, especially a marine engine.

2. Description of the Prior Art

In order to completely prevent the dispersion and leakage of a fuel to the outside of a marine engine and fire on a ship on the sea, generally speaking, a high-pressure fuel injection tube of the above-specified type is constructed such that a joint cylinder 13 fitted on separate outer tubes 12 and 12' fitted axially movably on the outer circumference of a tube body 11 while leaving a gap 14 between their opposed end faces has its two end portions welded at W and W' to the inner end portions of the outer tubes 12 and 12' to make a double wall structure.

In this structure of the prior art, however, with the output tubes 12 and 12' being fitted in position on the tube body 11, the joint cylinder 13 is fitted to have its two end portions soldered or welded at W and W' to the outer tubes 12 and 12' This welding step is troublesome and invites the deterioration of the mechanical strength due to the heating treatment of the tube body 11 in the vicinity of the selded portions and the deterioration of corrosion-resistance due to th thermal damage of the anti-corrosive surface films of the outer tubes 12 and 12'. Specifically, the welding step is required at the two portions after the assembly has been ended to a substantial product state. At the same time, the film plated with Zn or the like is damaged by the heat treatment and has to be repaired by a painting step or the like. On the other hand, the tube body 11 is prepared by elongating and heating a mother tube of steel and/or stainless steel repeatedly to give it several characteristics such as the plactic hardness. As a result of the aforementioned welding treatment W and W', the steel tube has a tendency to become fragile or soft due to the course crystal structure and the annealed structure. The stainless steel tube is degraded due to the Cr-C deposition. By the deterioration in the mechanical strength and the vibration from the engine, the tube used in the engine has its wall cracked after a long time use to induce the dispersion and leakage of the fuel in the spray form to the outside. Thus safer counter-measures are desired at present.

SUMMARY OF THE INVENTION

The present invention has been conceived in view of the above-specified problems of the prior art and has as an object to provide a high-pressure fuel injection tube for a diesel engine, especially for marine engine, which is enabled to prevent the dispersion and leakage of the fuel to the outside and to make the prevention of fire more reliable for a long use by eliminating the step of welding the circumferential wall of the tube body in the vicinity of the end portions fitted in the joint cylinder and accordingly the troublesome repair of the anti-corrosive film and the deterioration of the mechanical strength.

In order to achieve the above-specified object, according to the present invention, there is provided a high pressure fuel injection tube for a diesel engine, comprising: a tube body having connecting heads at its two end portions; fastening nuts assembled at the backs of said connecting heads; a pair of separate outer tubes so fitted on the outer circumference of said tube body as to be spaced from each other at a gap between the opposed end faces thereof and to move in the axial direction; seal ring members so fitted on the outer circumferences of said outer tubes in the vicinity of the outer end portions of said outer tubes as to engage with said fastening nuts respectively; and a relatively short joint cylinder fitted on the outer circumference of said outer tubes across the inner end portions of said outer tubes, wherein the improvement comprises a seal ring member fitted between at least one fitted end portion of said joint cylinder and the outer circumference of the faced one of said outer tubes. A clearance is left between the outer circumference of the tube body and the inner circumference of the outer tubes.

According to the present invention, to the outer circumference of the tube body having the connecting head at its one end, there is soldered or fitted through the seal ring member one outer tube at the connecting head and the identical side of the joint cylinder such that they are engaged through the seal ring member by one fastening nut having already been assembled in the vicinity of the outer end portion of the outer tube. From the other end of the tube body, there is fitted the other outer tube which is engaged through the seal ring member by the other fastening nut. After this, the other outer tube and the other fastening nut are moved toward the already formed connecting head, and the other end of the tube body is formed with the other connecting head. Then, the other fastening nut and the other outer tube are returned to the normal positions, and the joint cylinder is fitted through the seal ring member on the outer end portion of the outer tube. As a result, after the assembly, there are not required the troublesome steps such as the welding step or the film repairing step. In addition, the tube body positioned in the vicinity of the end portion having the joint cylinder can be freed from the deterioration in mechanical strength due to the heating treatment thereby to prevent the dispersion and leakage of the fuel to the outside. Thus, the countermeasures for the fire prevention can be better ensured for a long use.

Incidentally, the present invention still adopts the heating step such as the soldering step for fixing one outer tube and the joint cylinder or the joint cylinder and the socket member. This heating step is carried out in the state of parts before the parts are assembled into the product so that it can be easily performed and subjected to the anti-corrosive surface treatment.

DETAILED DESCRIPTION OF THE INVENTION

Figure 1:
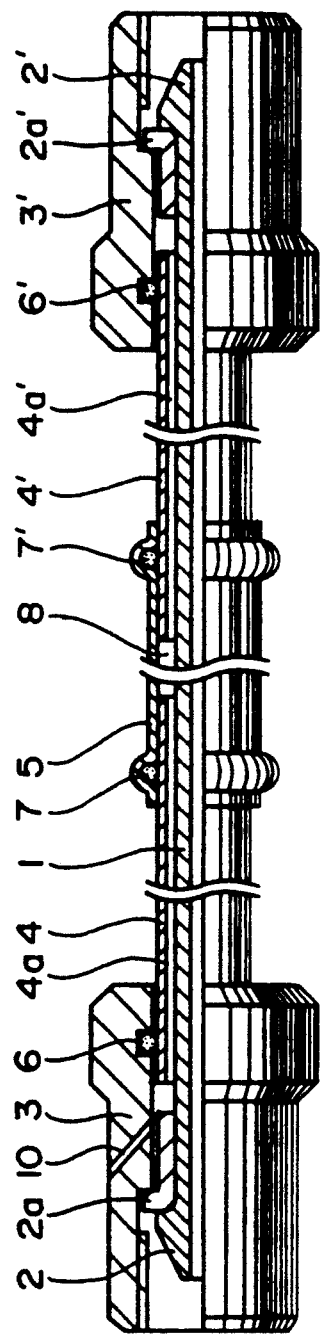
FIG. 1 is a partially cut-away longitudinal section showing a high-pressure fuel injection tube for a diesel engine according to an embodiment of the present invention.
Figure 2:
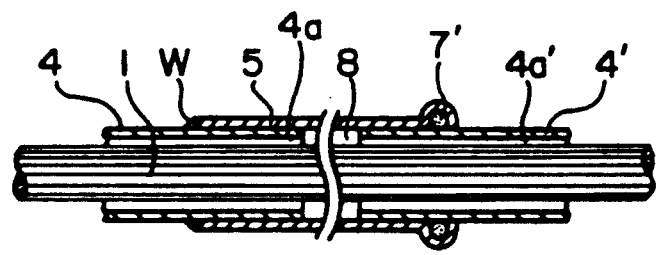
FIG. 2 is a partially cut-away longitudinal section showing an essential portion of another embodiment of the present invention.

The present invention will be described in the following in connection with its embodiments with reference to FIGS. 1 to 7. Reference numeral 1 designates an injection tube body which is formed at its two end portions with connecting heads 2 and 2'. At the backs of these connecting heads 2 and 2', there are assembled through sleeves 2a and 2a', if necessary, a pair of fastening nuts 3 and 3' which are fastened for connections. Specifically, one of separate outer tubes 4 and 4' and a joint cylinder 5 are either soldered at W (as shown in FIG. 2) to each other, with the outer tube 4 being engaged through a seal ring member 6 by the fastening nut 3 having already been assembled on outer end portion of the outer tube, or fitted through a seal ring member 7 (as shown in FIG. 1). Those outer tube 4 and joint cylinder 5 are then fitted on the outer circumference of the tube body 1 at its side formed with one of the connecting heads 2 and 2', such that a clearance 4a is preferably left between the outer circumference of the tube body 1 and the inner circumference of the outer tube 4. This outer tube 4 and the joint cylinder 5 are thus soldered and never fail to have their surfaces subjected to an anti-corrosive treatment such as a plating treatment with Zn or the like, if necessary, before they are fitted on the tube body 1. Next, the other outer tube 4' having its end portion engaged through a seal ring member 6' by the other fastening nut 3' is likewise fitted axially movably from the other end of the tube body 1 while leaving a gap 8 from the end face of the mating outer tube 4. This gap 8 is determined by considering a chuck holding allowance when the other connecting head 2' is formed, as will be described later. However, the gap 8 need not always be prepared at this time in the structure (of FIG. 1), in which the outer tube 4 and the joint cylinder 5 are fitted. Next, the end portion of the outer tube 4', as located in the joint cylinder 5, is fitted through a seal ring member 7' in the joint cylinder 5. Thus, the seal ring members 7 and 7' may be fitted between at least one of the end portions of the joint cylinder 5 and the corresponding one of the outer tubes 4 and 4'. Then, the other outer tube 4' and the other fastening nut 3' are moved toward the connecting head 2 already formed. In this state, the other end of the tube body 1 is chucked and punched to form the other connecting head 2'. After this, the other fastening nut 3' and the other outer tube 4' are returned to their normal positions, and the joint cylinder 5 is fitted across the outer tubes 4 and 4'. At this time, too, a clearance 4a' is preferably formed between the outer circumference of the tube body 1 and the inner circumference of the outer tube 4'.

Figure 3A:
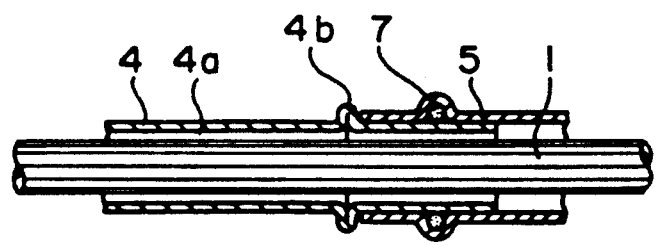
FIG. 3(a) and 3(b) are partial sections individually showing portions of other embodiments of the present invention.
Figure 3B:
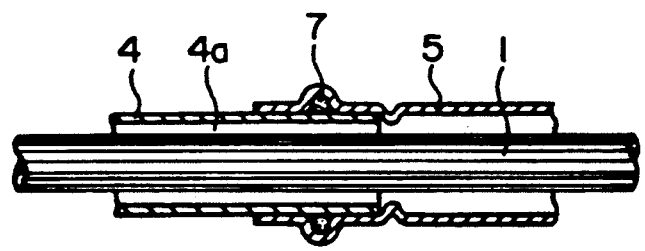
Figure 4:
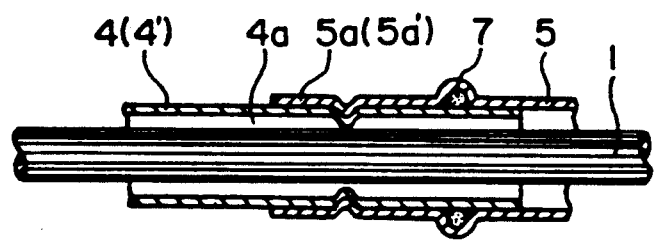
FIG. 4 is a partial section showing a portion of a further embodiment of the present invention.

In the embodiment having the joint cylinder 5 equipped with the seal ring members 7 and 7' at its two ends, the joint cylinder 5 is preferably bent so that it may be prevented from being moved from its normal position by the vibration coming from the engine. In order to effect the normal positioning of the joint cylinder 5, moreover, at least one of the outer tubes 4 and 4' can be formed with a spool 4b for abutting against the end portion of the joint cylinder 5, as shown in FIG. 3(a). As shown in FIG. 3(b), on the other hand, the joint cylinder 5 may be partially reduced to abut against the end face of the outer tube 4 or 4'. In order to ensure the fixed state of the joint cylinder 5 on the outer tubes 4 and 4', the joint cylinder 5 may have at least one of its end portions 5a and 5a' extended and reduced together with the corresponding circumferential wall of the outer tubes 4 and 4'.

Reference numeral 10 appearing in FIG. 1 designates a drain port for recovering the fuel which might leak from the seat of the connecting head 2 or 2' and from the tube body 1.

Figure 5A:
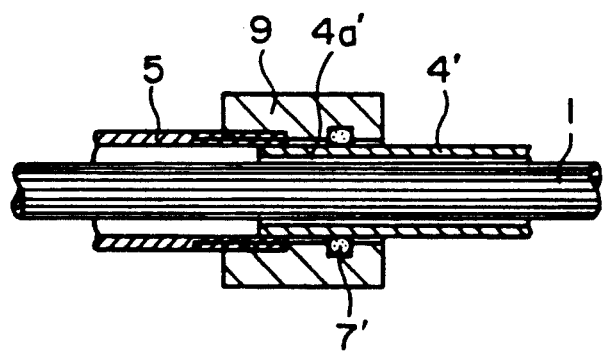
FIG. 5(a) and 5(b) are partial sections respectively showing a correspondence to FIG. 2 but a further embodiment and an improvement of FIG. 5(a)
Figure 5B:
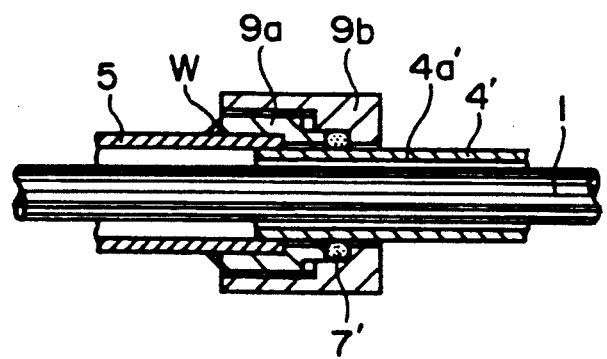
Figure 6:
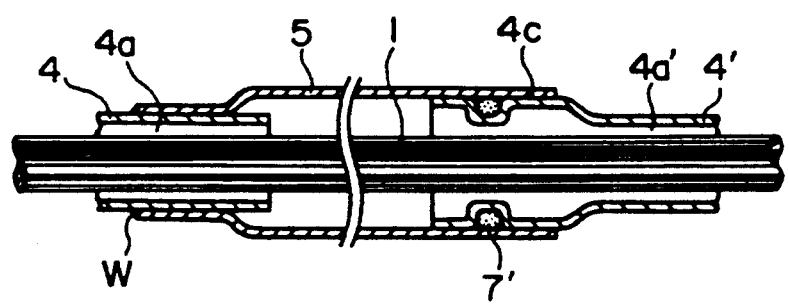
FIG. 6 is similar to FIG. 2 but shows a further embodiment.
Figure 7:
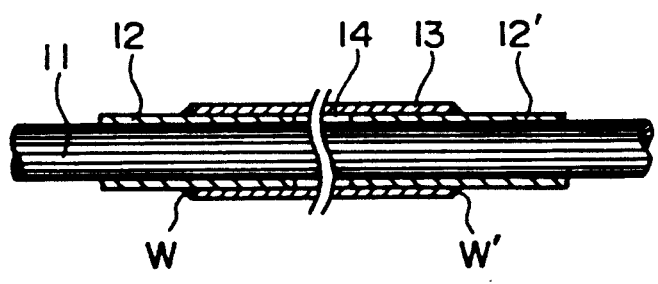
FIG. 7 is a partially cut-away longitudinal section showing a fitting portion of a joint cylinder of the high-pressure fuel injection tube of the prior art, as compared with an essential portion of the present invention.

In the individual embodiments thus far described, the joint cylinder 5 is formed in the inner circumference in the vicinity of its one or two ends with an annular groove or grooves for fitting the seal ring members 7 and/or 7' therein. In the present invention, however, there may be provided a separate socket member 9 which is formed in its inner circumference with an annular groove and arranged therein with the seal ring 7', as shown in FIG. 5(a). This socket member 9 can be fastened or soldered in advance to at least one end of the joint cylinder 5. If the socket member 9 is separated into two parts to be fastened for thrusting the seal ring member 7', as shown in the FIG. 5(b), the force for pushing the seal ring member 7' to the outer circumference of the outer tube 4' can be increased to improve the sealing effect better. As shown in FIG. 6, one end portion of the joint cylinder 5 and the faced end portion of the outer tube 4' can be radially enlarged, and the outer circumferences of the enlarged end portion 4c of the outer tube 4' can be formed with an annular groove for fitting the seal ring member 7' therein while pushing the seal ring member 7' onto the enlarged inner circumference of the joint cylinder 5.

As has been described hereinbefore, the high pressure fuel injection tube for a diesel engine according to the present invention is constructed such that at least one of the joint cylinders 5 is fitted on the separate and movable outer tubes 4 and 4' through the seal ring member 7 or 7' sandwiched between their facing circumferences. After assembly, therefore, no welding step is required so that the anti-corrosion surface film is not damaged by the welding to require no repair. Moreover, the mechanical strength of the tube body 1 near the end portion of the joint cylinder 5 is not deteriorated to prevent the fuel from dispersing or leaking in a sprayed state to the outside. Thus, it is possible to provide a remarkably useful high-pressure fuel injection tube.

What is claimed:

1. A high-pressure fuel injection tube for a diesel engine, comprising: a tube body having opposed end portions and connecting heads at the two end portions; fastening nuts assembled on said connecting heads; a pair of separate outer tubes fitted on the outer circumference of said tube body, said outer tubes having oppositely directed outer end portions and opposed facing inner end portions spaced from each other to define a gap between the opposed inner end portions said outer tubes being moveable in the axial direction; seal ring members so fitted on the outer circumferences of said outer tubes in the vicinity of the outer end portions of said outer tubes as to engage with said fasteninq nuts respectively; and a relatively short joint cylinder fitted on the outer circumferences of said outer tubes across the inner end portions of said outer tubes, wherein the improvement comprises a seal ring member fitted between at least one fitted end portion of said joint cylinder and the outer circumference of the corresponding one of said outer tubes.

2. A high-pressure fuel injection tube for a diesel engine according to claim 1, wherein a clearance is left between the outer circumference of said tube body and the inner circumference of each of said outer tubes.

3. A high-pressure fuel injection tube for a diesel engine according to claim 1, further comprising sleeves fitted on said connecting heads and between the outer circumference of said tube body and the inner circumferences of said fastening nuts.

4. A high-pressure fuel injection tube for a diesel engine according to claim 1, wherein at least one of said fastening nuts is formed with a drain port.

5. A high-pressure fuel injection tube for a diesel engine according to claim 1, wherein at least one of said outer tubes is formed with a spool for abutting against the corresponding end portion of said joint cylinder.

6. A high-pressure fuel injection tube for a diesel engine according to claim 1, wherein said joint cylinder is formed with a reduced portion for abutting against the inner end face of the corresponding one of said outer tubes.

7. A high-pressure fuel injection tube for a diesel engine according to claim 1, wherein said joint cylinder has as least its one end extended and reduced together with the circumferential wall of the corresponding one of said outer tubes.

8. A high-pressure fuel injection tube for a diesel engine according to claim 1, further comprising a separate socket member fixed on at least one end of said joint cylinder and having an annular groove fitting said seal ring member therein.

9. A high-pressure fuel injection tube for a diesel engine according to claim 8, wherein said socket member is separated into two parts for thrusting said seal ring member.

10. A high-pressure fuel injection tube for a diesel engine according to claim wherein one end portion of said joint cylinder and the corresponding inner end portion of the corresponding one of said outer tubes are radially enlarged so that the outer circumference of the enlarged end portion of said outer tube is formed with an annular groove for fitting said seal ring member therein while pushing said seal ring member onto the enlarged inner circumference of said joint cylinder.

* * * * *